US008963873B2

(12) United States Patent
Takeda

(10) Patent No.: US 8,963,873 B2
(45) Date of Patent: Feb. 24, 2015

(54) DATA PROCESSING DEVICE, DATA PROCESSING METHOD, DATA PROCESSING PROGRAM, AND COMPUTER-READABLE RECORDING MEDIUM WHICH RECORDS PROGRAM

(75) Inventor: Seiichi Takeda, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/131,702

(22) PCT Filed: Apr. 5, 2012

(86) PCT No.: PCT/JP2012/059403
§ 371 (c)(1),
(2), (4) Date: Jan. 9, 2014

(87) PCT Pub. No.: WO2013/027442
PCT Pub. Date: Feb. 28, 2013

(65) Prior Publication Data
US 2014/0146022 A1 May 29, 2014

(30) Foreign Application Priority Data
Aug. 22, 2011 (JP) ................................. 2011-180835

(51) Int. Cl.
*G06F 3/041* (2006.01)
*G06F 3/0354* (2013.01)
(Continued)

(52) U.S. Cl.
CPC ........ *G06F 3/03545* (2013.01); *G06F 3/04883* (2013.01); *G06F 3/04817* (2013.01); *G06F 3/041* (2013.01); *G06F 3/04886* (2013.01)
USPC ............................. 345/173; 345/179; 715/863

(58) Field of Classification Search
CPC . G06F 3/017; G06F 3/04883; G06F 3/04842; G06F 3/0482; G06F 3/0488; G06F 3/0236

USPC ......... 345/156, 163, 173, 174, 175, 176, 179; 175/810, 812, 813, 823, 863, 835, 845
See application file for complete search history.

(56) References Cited

U.S. PATENT DOCUMENTS

2004/0119763 A1* 6/2004 Mizobuchi et al. ........... 345/863
2006/0227139 A1* 10/2006 Momose ....................... 345/441
(Continued)

FOREIGN PATENT DOCUMENTS

EP 0740245 A2 10/1996
GB 2438524 A 11/2007
(Continued)

OTHER PUBLICATIONS

Japanese Office Action for JP 2011-180835 A dated Jan. 29, 2013.
(Continued)

*Primary Examiner* — Koosha Sharifi-Tafreshi
(74) *Attorney, Agent, or Firm* — Sughrue Mion, PLLC

(57) ABSTRACT

A data processing device includes an acquisition unit that, when, upon sequential instruction inputs by a user, an operation of enclosing an object displayed on a display screen with a trajectory of position information indicated by the instruction inputs is performed, acquires position information representing positions indicated by those instruction inputs, a recognition unit that recognizes the object as a selected object and further recognizes the direction of selection in which the selected object is enclosed, a determination unit that determines processing in accordance with the direction of selection, and an execution unit that executes the determined processing on the selected object. Processing desired by a user can be thereby made by simple instruction inputs such as selection of the direction of enclosing an object with a trajectory of a set of position information, and the selected processing can be executed on the selected object.

9 Claims, 15 Drawing Sheets

(51) Int. Cl.
*G06F 3/0488* (2013.01)
*G06F 3/0481* (2013.01)

(56) References Cited

U.S. PATENT DOCUMENTS

| | | | |
|---|---|---|---|
| 2008/0168403 A1 | 7/2008 | Westerman et al. | |
| 2009/0061948 A1* | 3/2009 | Lee et al. | 455/566 |
| 2009/0085936 A1* | 4/2009 | Chen et al. | 345/661 |
| 2010/0331080 A1* | 12/2010 | Taya | 463/30 |
| 2011/0029917 A1 | 2/2011 | Um | |
| 2011/0109581 A1* | 5/2011 | Ozawa et al. | 345/173 |
| 2012/0229392 A1 | 9/2012 | Morita | |

FOREIGN PATENT DOCUMENTS

| | | |
|---|---|---|
| JP | 11-149563 A | 6/1999 |
| JP | 2008-134911 A | 6/2008 |
| JP | 2009-119288 A | 6/2009 |
| JP | 2012-190215 A | 10/2012 |
| JP | 2013-20300 A | 1/2013 |
| WO | 2010144726 A1 | 12/2010 |

OTHER PUBLICATIONS

Japanese Office Action for JP 2011-180835 A dated May 14, 2013.
International Search Report for PCT/JP2012/059403 dated Jul. 17, 2012.
Translation of International Preliminary Report on Patentability dated Mar. 6, 2014 issued in Application No. PCT/JP2012/059403.
European Search Report dated Apr. 1, 2014 issued in corresponding European Patent Application No. 12826291.2.

* cited by examiner

*Fig.3*

| POSITION INFORMATION | COORDINATE VALUE | ACQUISITION TIME |
|---|---|---|
| ⋮ | ⋮ | ⋮ |
| $P_1$ | $(X_1, Y_1)$ | $t_1$ |
| $P_2$ | $(X_2, Y_2)$ | $t_2$ |
| $P_3$ | $(X_3, Y_3)$ | $t_3$ |
| $P_4$ | $(X_4, Y_4)$ | $t_4$ |
| $P_5$ | $(X_5, Y_5)$ | $t_5$ |
| $P_6$ | $(X_6, Y_6)$ | $t_6$ |
| $P_7$ | $(X_7, Y_7)$ | $t_7$ |
| ⋮ | ⋮ | ⋮ |

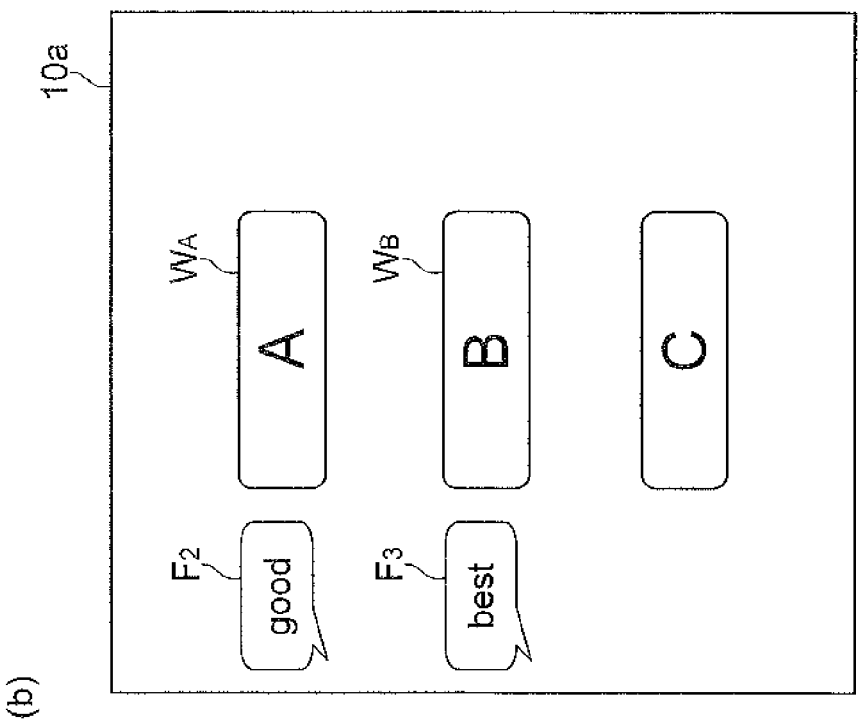
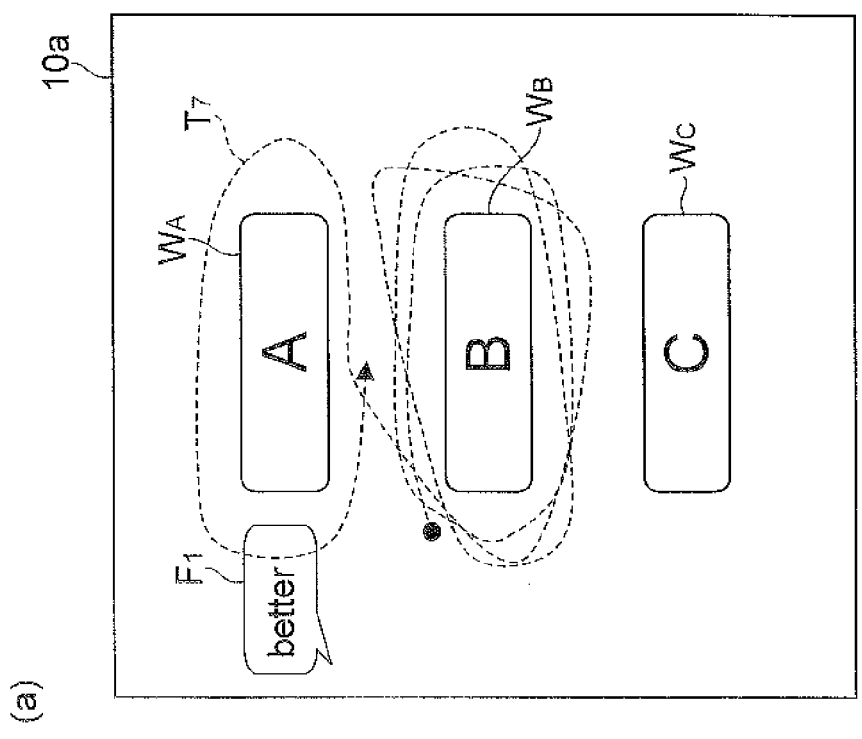
Fig. 11

DATA PROCESSING DEVICE, DATA PROCESSING METHOD, DATA PROCESSING PROGRAM, AND COMPUTER-READABLE RECORDING MEDIUM WHICH RECORDS PROGRAM

CROSS REFERENCE TO RELATED APPLICATIONS

This application is a National Stage of International Application No. PCT/JP2012/059403 filed Apr. 5, 2012, claiming priority based on Japanese Patent Application No. 2011-180835 filed Aug. 22, 2011, the contents of all of which are incorporated herein by reference in their entirety.

TECHNICAL FIELD

The present invention relates to a data processing device, a data processing method, a data processing program, and a computer-readable recording medium storing the program.

BACKGROUND ART

There has been a data processing device, such as a game machine, for example, that executes specified processing by an operation of enclosing an object displayed on a display screen with the input path of a pointing device. For example, in Patent Literature 1 below, a device that, when an object displayed on a display screen is enclosed with the input path of a pointing device, executes processing in accordance with the type of the enclosed object is disclosed.

CITATION LIST

Patent Literature

PTL 1: Japanese Unexamined Patent Application Publication No. 2009-119288

SUMMARY OF INVENTION

Technical Problem

In the above-described related art, the detail of processing after selection of an object is decided in accordance with the type of the enclosed object. However, there is a case where a user selects desired processing from candidates for processing and desires execution of the processing on the object. According to the related art, the processing to be performed is decided in accordance with the type of a selected object, and therefore the processing desired by a user cannot be executed.

In view of the foregoing, an object of the present invention is to provide a data processing device, a data processing method, a data processing program, and a computer-readable recording medium storing the program that allow execution of processing desired by a user among candidates for processing with a simple instruction input.

Solution to Problem

To solve the above problem, a data processing device according to one aspect of the invention is a data processing device including a display means configured to display an image including an object representing an object to be processed in an image display area on a display screen and an input means configured to receive an instruction input indicating a position on the display screen, including an acquisition means configured to acquire position information indicating a position of an instruction input received by the input means, a recognition means configured to specify an enclosed region in the image display area based on a trajectory indicated by a set of position information acquired by the acquisition means according to sequential instruction inputs through the input means, and when an object is included in the enclosed region, recognize the object as a selected object and recognize a direction the selected object is enclosed by the trajectory of the set of position information as a direction of selection, a determination means configured to determine processing to be performed on the selected object in accordance with the direction of selection recognized by the recognition means, and an execution means configured to execute the processing determined by the determination means on the selected object.

A data processing method according to one aspect of the invention is a data processing method in a data processing device including a display means configured to display an image including an object representing an object to be processed in an image display area on a display screen and an input means configured to receive an instruction input indicating a position on the display screen, the method including an acquisition step of acquiring position information indicating a position of an instruction input received by the input means, a recognition step of specifying an enclosed region in the image display area based on a trajectory indicated by a set of position information acquired in the acquisition step according to sequential instruction inputs through the input means, and when an object is included in the enclosed region, recognizing the object as a selected object and recognizing a direction the selected object is enclosed by the trajectory of the set of position information as a direction of selection, a determination step of determining processing to be performed on the selected object in accordance with the direction of selection recognized in the recognition step, and an execution step of executing the processing determined in the determination step on the selected object.

A data processing program according to one aspect of the invention is a data processing program causing a computer to function as a data processing device including a display means configured to display an image including an object representing an object to be processed in an image display area on a display screen and an input means configured to receive an instruction input indicating a position on the display screen, the program causing the computer to implement an acquisition function to acquire position information indicating a position of an instruction input received by the input means, a recognition function to specify an enclosed region in the image display area based on a trajectory indicated by a set of position information acquired by the acquisition function according to sequential instruction inputs through the input means, and when an object is included in the enclosed region, recognize the object as a selected object and recognize a direction the selected object is enclosed by the trajectory of the set of position information as a direction of selection, a determination function to determine processing to be performed on the selected object in accordance with the direction of selection recognized by the recognition function, and an execution function to execute the processing determined by the determination function on the selected object.

A computer-readable recording medium according to one aspect of the invention is a computer-readable recording medium storing a data processing program causing a computer to function as a data processing device including a display means configured to display an image including an object representing an object to be processed in an image display area on a display screen and an input means configured to receive an instruction input indicating a position on the display screen, the data processing program causing the computer to implement an acquisition function to acquire position information indicating a position of an instruction input received by the input means, a recognition function to specify an enclosed region in the image display area based on a trajectory indicated by a set of position information acquired by the acquisition function according to sequential instruction inputs through the input means, and when an object is included in the enclosed region, recognize the object as a selected object and recognize a direction the selected object is enclosed by the trajectory of the set of position information as a direction of selection, a determination function to determine processing to be performed on the selected object in accordance with the direction of selection recognized by the recognition function, and an execution function to execute the processing determined by the determination function on the selected object.

According to the above-described aspect, when, in response to sequential instruction inputs by a user, an operation of enclosing an object displayed on a display screen by the trajectory of position information indicated by the instruction inputs is performed, the object is selected as the selected object and further the direction of selection in which the selected object is enclosed is recognized. Then, processing determined in accordance with the direction of selection is executed on the selected object, and therefore selection of processing desired by a user is made by simple instruction inputs such as selection of the direction of enclosing an object by the trajectory of position information, and the selected processing can be executed on the selected object.

In the data processing device according to another aspect, the recognition means may recognize which of a first direction and a second direction opposite to the first direction the direction of selection is, the determination means may determine to perform first processing on the selected object when the selected object is enclosed in the first direction by the trajectory of the set of position information and perform second processing different from the first processing on the selected object when the selected object is enclosed in the second direction by the trajectory of the set of position information, the first processing may be processing of changing an object to be processed represented by the selected object from a first state to a second state, and the second processing may be processing of changing the object to be processed from the second state to the first state.

According to the above aspect, a user encloses an object with instruction inputs forming a trajectory in any of the first direction and the second direction, and thereby processing desired by a user selected from processing of changing an object to be processed represented by the object from the first state to the second state and processing of changing it from the second state to the first state can be executed.

In the data processing device according to another aspect, the recognition means may further recognize a number of times the selected object is enclosed by the trajectory of the set of position information as a number of selections, and the determination means may determine processing to be performed on the selected object in accordance with the direction of selection and the number of selections recognized by the recognition means.

According to the above aspect, when instruction inputs for enclosing an object are made by a user, the direction of selection in which the object is enclosed and the number of times the object is enclosed are recognized, and processing determined in accordance with the direction of selection and the number of selections is executed on the selected object. Therefore, selection of processing desired by a user is made by simple instruction inputs such as selection of the direction and the number of times of enclosing an object by the trajectory of position information, and the selected processing can be executed on the selected object.

In the data processing device according to another aspect, the recognition means may recognize which of a first direction and a second direction opposite to the first direction the direction of selection is, the first processing may be processing of changing an object to be processed represented by the selected object from an unselected state to a selected state in a quantity corresponding to the number of selections in the first direction, and the second processing may be processing of changing an object to be processed represented by the selected object from a selected state to an unselected state in a quantity corresponding to the number of selections in the second direction.

According to the above aspect, by simple instruction inputs such as selection of the direction and the number of times of enclosing an object by the trajectory of position information, processing of changing an object to be processed represented by the object from an unselected state to a selected state or changing it from a selected state to an unselected state can be executed, setting a desired quantity as an attribute of the object to be processed.

In the data processing device according to another aspect, the recognition means may recognize which of a first direction and a second direction opposite to the first direction the direction of selection is, the first processing may be processing of increasing a level of weights on an object to be processed represented by the selected object by a level corresponding to the number of selections in the first direction, and the second processing may be processing of decreasing a level of weights on an object to be processed represented by the selected object by a level corresponding to the number of selections in the second direction.

According to the above aspect, by simple instruction inputs such as selection of the direction and the number of times of enclosing an object by the trajectory of position information, processing of increasing or decreasing the level of weights on an object to be processed represented by the object can be executed.

In the data processing device according to another aspect, the recognition means may recognize a number of times obtained by subtracting, from the number of times the selected object is enclosed in one direction by the trajectory of the set of position information, the number of times the selected object is enclosed in an opposite direction to the one direction as the number of selections in the one direction.

According to the above aspect, the number of selections for determining the processing to be performed on the selected object can be easily adjusted.

In the data processing device according to another aspect, the first processing may be processing of encrypting data identified by the selected object, and the second processing may be processing of decrypting data identified by the selected object.

According to the above aspect, by simple instruction inputs such as selection of the direction of enclosing an object by the trajectory of position information, processing of encrypting or decrypting data identified by the object can be executed.

In the data processing device according to another aspect, the first processing may be processing of compressing data identified by the selected object, and the second processing may be processing of decompressing data identified by the selected object.

According to the above aspect, by simple instruction inputs such as selection of the direction of enclosing an object by the trajectory of position information, processing of compressing or decompressing data identified by the object can be executed.

Advantageous Effects of Invention

According to one aspect of the present invention, it is possible to allow execution of processing desired by a user among candidates for processing with a simple instruction input.

BRIEF DESCRIPTION OF DRAWINGS

FIG. 3 is a diagram showing an example of position information acquired by an acquisition unit.

FIG. 11 is a diagram showing another embodiment where processing in accordance with the number of selections and the direction of selection of a selected object executed.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
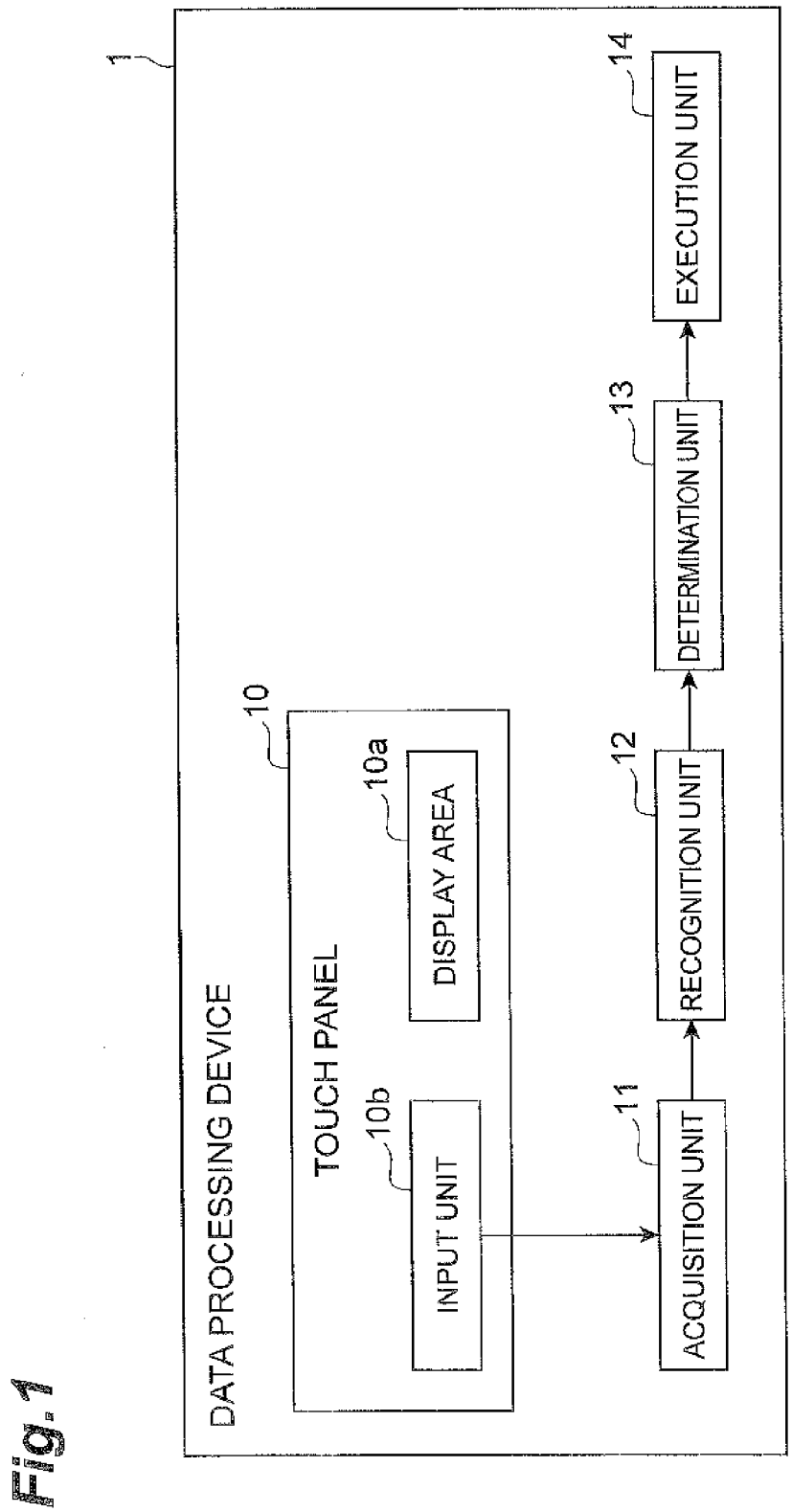
FIG. 1 is a block diagram showing a functional configuration of a data processing device.

FIG. 1 is a block diagram showing a functional configuration of a data processing device 1 according to this embodiment. The data processing device 1 is a device that includes a display means that displays an image including an object representing an object to be processed on a display screen and an input means that receives an instruction input indicating a position on the display screen. The data processing device 1 is a terminal having a so-called touch panel, for example. The touch panel displays an image on a display screen and is provided with an input means that detects physical contact on the display screen and can thereby detect a position at which physical contact on the display screen is detected.

Further, the data processing device 1 may be a personal computer that includes a display and a pointing device, for example. The display displays an image on a display screen, and the pointing device can receive an instruction input indicating a position on the display screen. A user uses the pointing device to make an instruction input indicating an arbitrary position of an image that is displayed on the display screen.

The data processing device 1 according to this embodiment is described hereinafter using the example of the terminal having a touch panel. As shown in FIG. 1, the data processing device 1 functionally includes a touch panel 10, an acquisition unit 11, (acquisition means), a recognition unit 12 (recognition means), a determination unit 13 (determination means), and an execution unit 14 (execution means).

Figure 2:
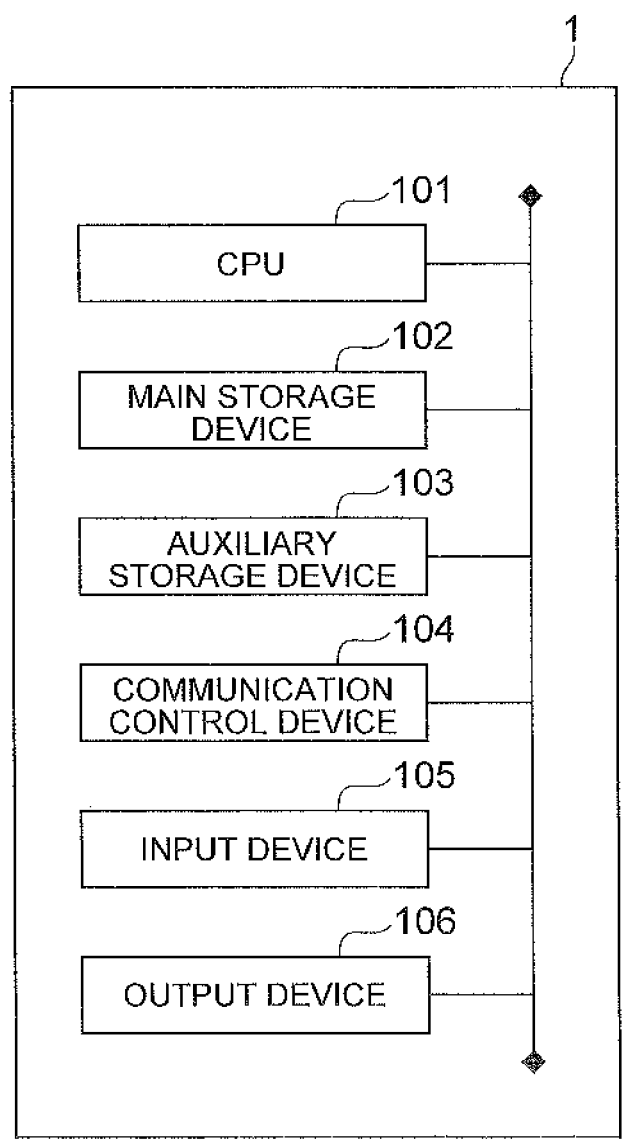
FIG. 2 is a diagram showing a hardware configuration of a data processing device.

FIG. 2 is a hardware configuration diagram of the data processing device 1. As shown in FIG. 2, the data processing device 1 is physically configured as a computer system that includes a CPU 101, a main storage device 102 such as memory like RAM and ROM, an auxiliary storage device 103 such as a hard disk, a communication control device 104 such as a network card, input device 105 such as a keyboard and a mouse, an output device 106 such as a display and the like.

The functions shown in FIG. 1 are implemented by loading given computer software (data processing program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The touch panel 10 includes a display area 10a (display screen) and an input unit 10b (input means). The display area 10a is an area on a display screen that displays an image including an object representing an object to be processed, and displays an image under control of the execution unit 14. The input unit 10b is a unit that receives an instruction input indicating a position on the display area 10a.

The object representing an object to be processed is an icon representing a file, text representing a file name and the like, for example. Further, on an item selection screen of an e-commerce site or the like, the object is text representing an item name, an image of an item and the like, for example.

The acquisition unit 11 is a part that acquires position information indicating the position of the instruction input received by the input unit 10b. FIG. 3 is a diagram showing an example of position information acquired by the acquisition unit 11. As shown in FIG. 3, position information P includes a coordinate value indicating a position in the display area 10a and time when the position information is acquired. The x-axis and the y-axis in the coordinate system in the position information P are respectively set to the crosswise direction and the lengthwise direction when the data processing device 1 is in the position where a normal operation by a user is performed thereon, for example.

Further, when sequential instruction inputs are received through the input unit 10b, the acquisition unit 11 acquires a plurality of position information $P_1$ to $P_7$ in time-series fashion as shown in FIG. 3, for example. The acquisition unit 11 outputs the acquired position information P to the recognition unit 12.

The recognition unit 12 is a part that specifies an enclosed region on the basis of the trajectory of a set of position information received by the acquisition unit 11 based on the sequential instruction inputs through the input unit 10b and, when an object is included in the enclosed region, recognizes the object as a selected object and further recognizes the direction in which the selected object is enclosed by the trajectory of a set of position information as a direction of selection. An example of recognition of the selected object by the recognition unit 12 is described with reference to FIG. 4.

Figure 4:
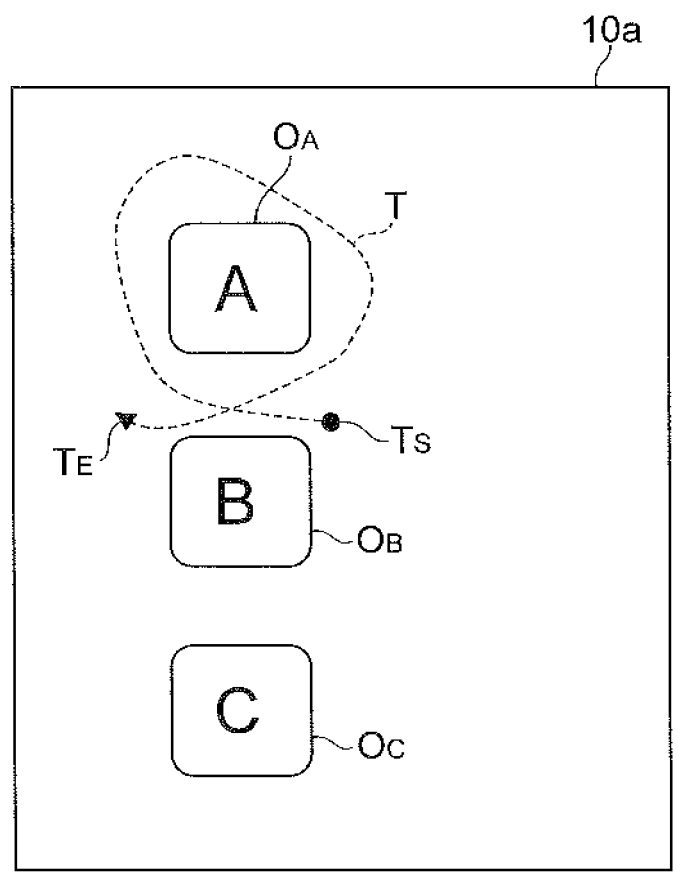
FIG. 4 is a diagram showing an example of recognition of a selected object by a recognition unit.

In the example shown in FIG. 4, an image including objects $O_A$ to $O_C$ is displayed on the display area 10a of the touch panel 10, and the trajectory T of the position information received by the acquisition unit 11 based on the sequential instruction inputs extends from the starting point $T_S$ to the end point $T_E$, forming a closed region. In this case, the recognition unit 12 specifies the closed region formed by the trajectory T of the position information as the enclosed region. Then, when the object $O_A$ is included in the enclosed region, the recognition unit 12 recognizes the object $O_A$ as the selected object.

Figure 5:
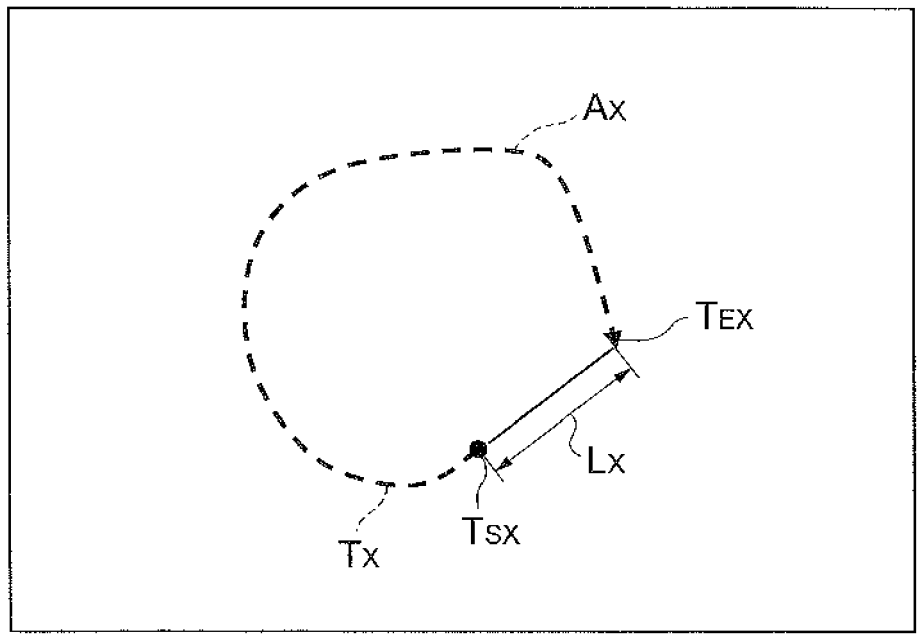
FIG. 5 is a diagram showing an example of processing of recognizing a selected region by a recognition unit.

Further, as shown in FIG. 5, even when a closed region is not formed by the trajectory of a set of position information, if the trajectory of a set of position information satisfies specified conditions, the recognition unit 12 can specify the enclosed region. In the example of FIG. 5, the trajectory $T_X$ of position information reaches the end point $T_{EX}$ without any intersection from the starting point $T_{SX}$, and thus a closed region is not formed by the trajectory $T_X$. In this case also, when specified conditions such as that a distance $L_X$ between the starting point $T_{SX}$ and the end point $T_{EX}$ is a specified distance or less, or when the ratio of the distance $L_X$ between the starting point $T_{SX}$ and the end point $T_{EX}$ to the length of the trajectory $T_X$ is a specified ratio or less are satisfied, the recognition unit 12 can specify the enclosed region by assuming that the trajectory of position information exists between the starting point $T_{SX}$ and the end point $T_{EX}$ of the trajectory $T_X$. Then, the recognition unit 12 can set the selected region $A_X$ based on the specified enclosed region.

Further, when the center-of-gravity point of a region enclosed by a line connecting the trajectory $T_X$ and the points $T_{EX}$ and $T_{SX}$ is calculated, and an angle between a line connecting the point $T_{EX}$ and the center-of-gravity point and a line connecting the point $T_{SX}$ and the center-of-gravity point is a specified angle or less, the recognition unit 12 may specify the selected region $A_X$ by assuming that the trajectory of position information exists between the starting point $T_{SX}$ and the end point $T_{EX}$ of the trajectory $T_X$.

Further, the recognition unit 12 recognizes a direction in which an object is enclosed by the trajectory T of the position information as a direction of selection. Specifically, the recognition unit 12 recognizes which of a first direction and a second direction opposite to the first direction the direction of selection is.

Note that the determination as to whether the closed recon or the enclosed region is formed based on the trajectory of continuous position information may be made by applying a known character recognition technique or the like, for example. In the known character recognition technique, the open source library which is known to those skilled in the art or the like is used, for example. Further, in such a technique, it can be determined by which of the clockwise and counterclockwise trajectories the closed region or the enclosed region is formed. Furthermore, when the closed region or the enclosed region is formed by the character recognition technique using the open source library or the like, the recognition unit 12 can determine by which of the clockwise and counterclockwise trajectories the enclosed region is formed based on a change in the slope of the vector connecting the two position information acquired sequentially in a time series, for example.

Further, the recognition unit 12 can determine whether an object is within the enclosed region or not by comparing position information indicating the range of the enclosed region and position information indicating the layout position of the object on the display screen.

Figure 6:
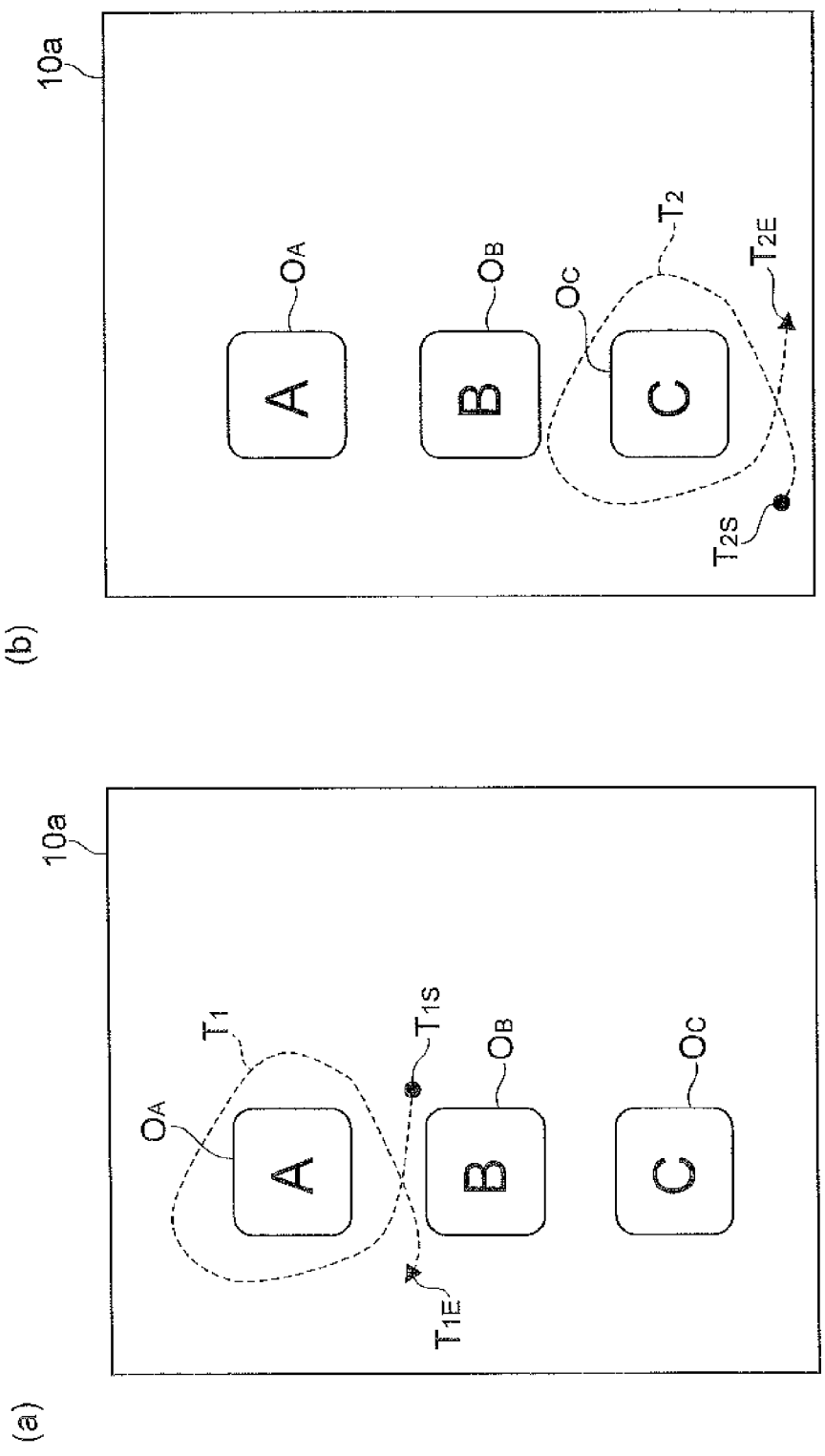
FIG. 6 is a diagram showing an example of recognition of the direction of selection by a recognition unit.

An example of recognition of the direction of selection by the recognition unit 12 is described with reference to FIG. 6. In the example of FIG. 6, the recognition unit 12 recognizes which of the clockwise and counterclockwise directions the direction of selection is.

In the example shown in FIG. 6(a), an image including objects $O_A$ to $O_C$ is displayed on the display area 10a, and the trajectory $T_1$ of the position information extends from the starting point $T_{1S}$ to the end point $T_{1E}$, and the object $O_A$ is enclosed in the clockwise direction by the trajectory $T_1$. In this case, the recognition unit 12 recognizes the object $O_A$ as the selected object and recognizes the clockwise direction as the direction of selection.

On the other hand, in the example shown in FIG. 6(b), an image including objects $O_A$ to $O_C$ is displayed on the display area 10a, and the trajectory $T_2$ of the position information extends from the starting point $T_{2S}$ to the end point $T_{2E}$, and the object $O_C$ is enclosed in the counterclockwise direction by the trajectory $T_2$. In this case, the recognition unit 12 recognizes the object $O_C$ as the selected object and recognizes the counterclockwise direction as the direction of selection.

The determination unit 13 is a part that determines processing to be performed on the selected object in accordance with the direction of selection recognized by the recognition unit 12. Specifically, the determination unit 13 can determine to perform first processing on the selected object when the selected object is enclosed in the first direction by the trajectory T of the position information and to perform second processing, which is different from the first processing, on the selected object when the selected object is enclosed in the second direction by the trajectory T of the position information.

In the example shown in FIG. 6, the determination unit 13 determines to perform the first processing on the object $O_A$ that is enclosed in the clockwise direction by the trajectory $T_1$ of the position information, for example. On the other hand, the determination unit 13 determines to perform the second processing on the object $O_C$ that is enclosed in the counterclockwise direction by the trajectory $T_2$ of the position information, for example. In this manner, the first processing or the second processing is selected by selecting the direction of enclosing an object with instruction inputs sequentially indicating positions, and therefore a user can easily select the processing to be performed on the object.

The execution unit 14 is a part that executes the processing determined by the determination unit 13 on the selected object. In the example shown in FIG. 6, the execution unit 14 executes the first processing on the object $O_A$ and executes the second processing on the object $O_C$.

Further, the execution unit 14 may execute processing of changing an object to be processed represented by the selected object from a first state to a second state as the first processing and executes processing of changing an object to be processed represented by the selected object from the second state to the first state as the second processing. In this case, a user can make the data processing device 1 perform the processing of changing an object to be processed from the first state to the second state and the processing of changing an object to be processed from the second state to the first state easily by selection of the direction of enclosing the object.

To be more specific, the execution unit 14 may execute processing of encrypting data identified by the selected object as the first processing and processing of decrypting data identified by the selected object as the second processing.

Further, the execution unit 14 may execute processing of compressing data identified by the selected object as the first processing and processing of decompressing data identified by the selected object as the second processing.

Furthermore, in the case where the data processing device 1 according to this embodiment provides an e-commerce site and an item selection screen is displayed on the display area 10a, the execution unit 14 may execute processing of adding an attribute as an item to be purchased to an item identified by the selected object as the first processing and processing of deleting an attribute as an item to be purchased from item identified by the selected object as the second processing. The processing such as adding and deleting an attribute as an item to be purchased is represented as a user interface for adding or deleting an item to or from a so-called shopping cart on the item selection screen.

Note that the first and second processing executed in accordance with the direction of selection is not limited to the above-described examples and may be any processing as long as they are different from each other. For example, in the case where the data processing device 1 according to this embodiment is applied to an application for managing email, the execution unit 14 may execute processing of sorting email into one folder as the first processing when an icon indicating the email is enclosed in the first direction by the trajectory T of the position information, and execute processing of sorting email into another folder different from the one folder as the second processing when an icon indicating the email is enclosed in the second direction by the trajectory T of the position information. Further, the execution unit 14 may execute processing of archiving email as the first processing when an icon indicating the email is enclosed in the first direction by the trajectory T of the position information, and execute processing of deleting email as the second processing when an icon indicating the email is enclosed in the second direction by the trajectory T of the position information.

Further, in the case where the data processing device 1 according to this embodiment is applied to an application for displaying or editing text, for example, the execution unit 14 may execute processing of adding a marker (for example, underline) to text as the first processing when the text is enclosed in the first direction by the trajectory T of the position information, and execute processing of deleting a marker from text as the second processing when the text is enclosed in the second direction by the trajectory T of the position information. Furthermore, the execution unit 14 may execute processing of copying text as the first processing when the text is enclosed in the first direction by the trajectory T of the position information, and execute processing of cutting text as the second processing when the text is enclosed in the second direction by the trajectory T of the position information.

Further, the recognition unit 12 may additionally recognize the number of times the selected object is enclosed by the trajectory T of the position information as the number of selections, and the determination unit 13 may determine processing to be performed on the selected object in accordance with the direction of selection and the number of selections recognized by the recognition unit 12.

To be more specific, the recognition unit 12 recognizes which of the first direction and the second direction opposite to the first direction the direction of selection is and further recognizes the number of selections, for example. Then, the determination unit 13 may determine to perform the first processing that is specified by a first parameter on the selected object when the selected object is enclosed in the first direction and to perform the second processing, which is different from the first processing, that is specified by a second parameter on the selected object when the selected object is enclosed in the second direction. In this case, the determination unit 13 can determine the first parameter in accordance with the number of selections in the first direction and determine the second parameter in accordance with the number of selections in the second direction.

Figure 7:
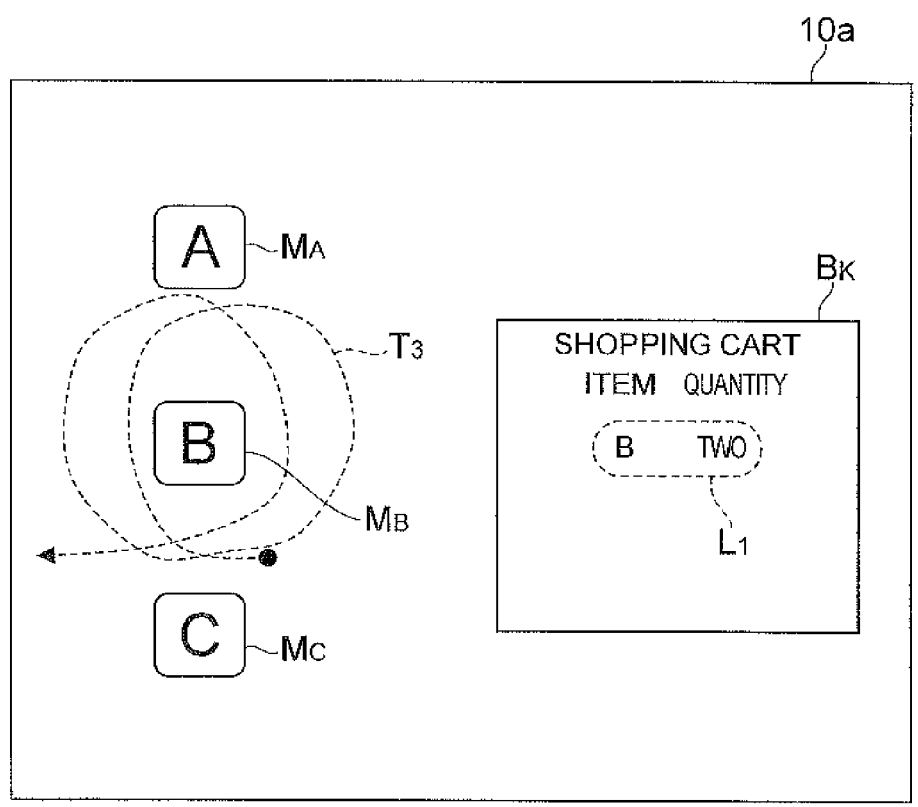
FIG. 7 is a diagram showing an example of recognition of the direction of selection and the number of selections and processing to be executed.
Figure 8:
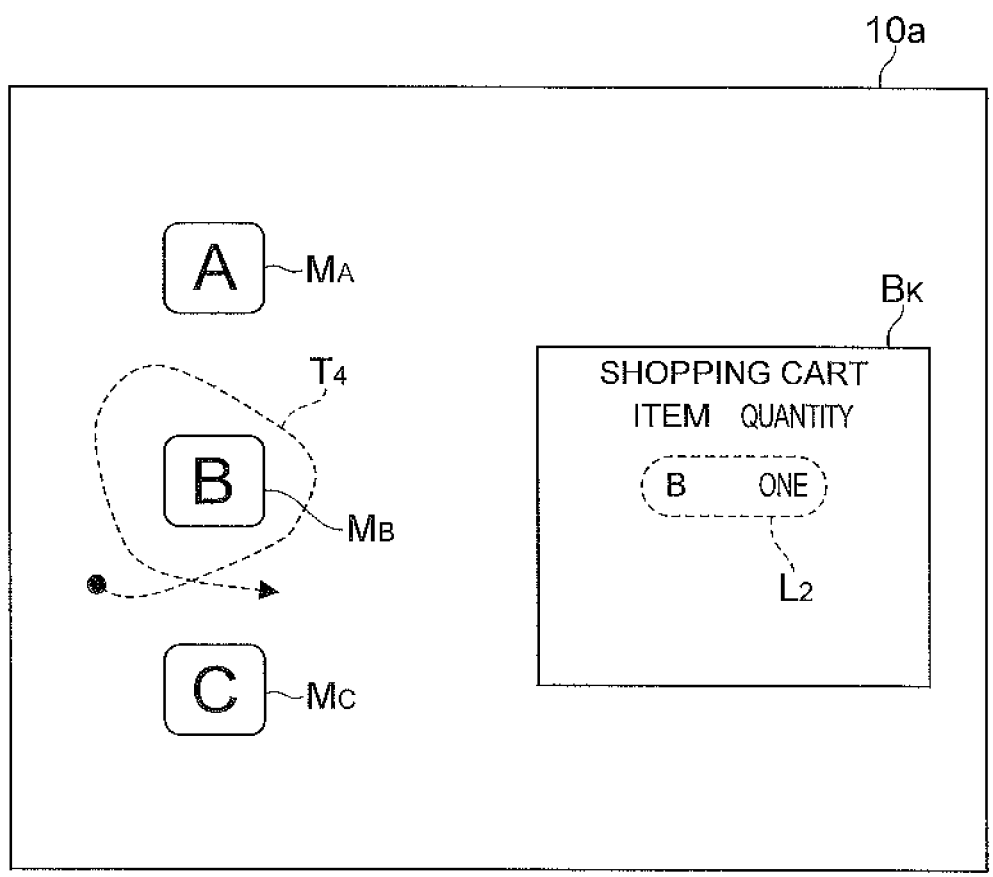
FIG. 8 is a diagram showing an example of recognition of the direction of selection and the number of selections and processing to be executed.

The above-described processing is described hereinafter with reference to FIGS. 7 to 8. FIGS. 7 to 8 are diagrams showing examples of processing of selecting an item on an item selection screen as an item to be purchased in the case where the data processing device 1 provides an e-commerce site, and the item selection screen is displayed on the display area 10a. In the examples shown in FIGS. 7 to 8, it is assumed that, when an icon is enclosed in the clockwise direction, processing of adding an item represented by the icon to a shopping cart is executed, and when an icon is enclosed in the counterclockwise direction, processing of deleting an item represented by the icon from a shopping cart is executed, and further the number of times the icon is enclosed is associated with a parameter such as the quantity of the item.

In the example shown in FIG. 7, an image including icons $M_A$ to $M_C$ that represent items is displayed on the display area 10a of the touch panel 10, and the trajectory $T_3$ of the position information encloses the icon $M_B$ twice in the clockwise direction. In this case, the recognition unit 12 recognizes the icon $M_B$ as the selected object. Further, the recognition unit 12 recognizes the clockwise direction as the direction of selection and recognizes twice as the number of selections. Then, the determination unit 13 determines to perform processing of adding two of the item B to a shopping cart based on the direction of selection and the number of selections recognized by the recognition unit 12. Then, the execution unit 14 executes processing of adding two items B to a shopping cart $B_K$ according to the processing determined by the determination unit 13 (see the shopping list $L_1$ in the shopping cart $B_K$).

In the example shown in FIG. 8, the trajectory $T_4$ of the position information encloses the icon $M_B$ twice in the clockwise direction. In this case, the recognition unit 12 recognizes the icon $M_B$ as the selected object. Further, the recognition unit 12 recognizes the counterclockwise direction as the direction of selection and recognizes once as the number of selections. Then, the determination unit 13 determines to perform processing of deleting one of the item B from a shopping cart based on the direction of selection and the number of selections recognized by the recognition unit 12. Then, the execution unit 14 executes processing of deleting one item B from the shopping cart $B_K$ where two items B have been saved according to the processing determined by the determination unit 13 (see the shopping list $L_2$ in the shopping cart $B_K$).

Figure 9:
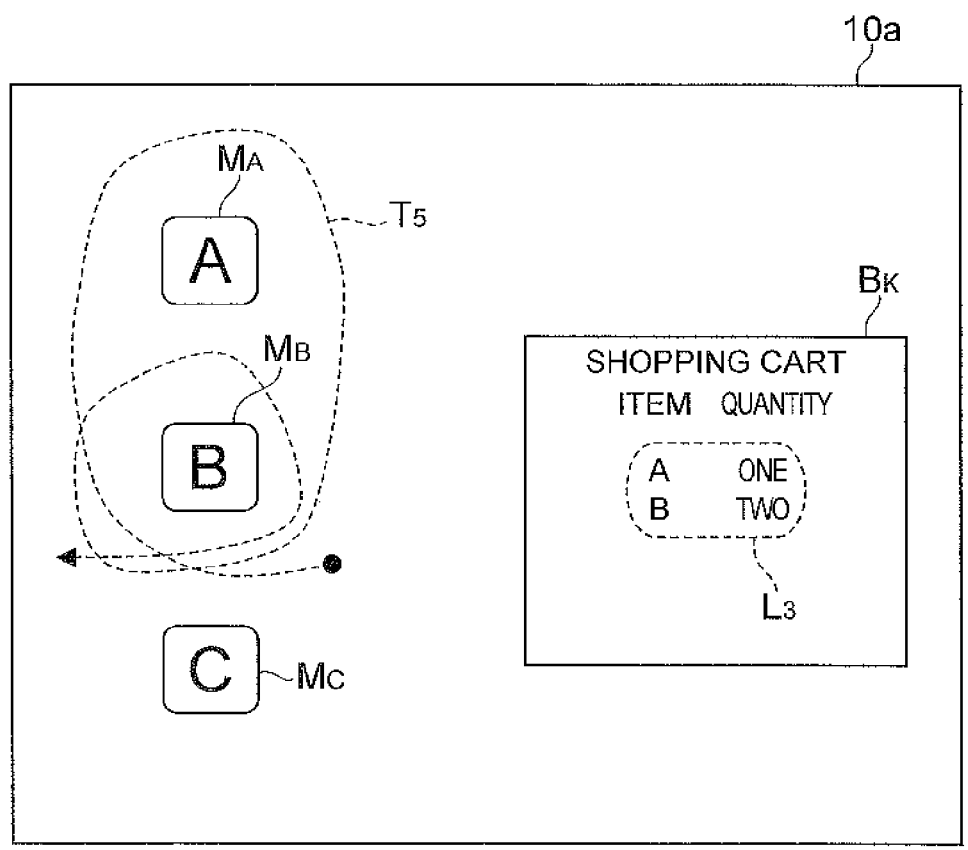
FIG. 9 is a diagram showing an example of recognition of the direction of selection and the number of selections and processing to be executed.

Further, in the example shown in FIG. 9, the trajectory $T_5$ of the position information encloses the icons $M_A$ and $M_B$ once in the clockwise direction and further encloses the icon $M_B$ once in the clockwise direction. Thus, the icon $M_A$ is enclosed once by the trajectory $T_5$ of the position information and the icon $M_B$ is enclosed twice by the trajectory $T_5$ of the position information. In this case, the determination unit determines processing to be performed for each icon M. Specifically, the determination unit determines to perform processing of adding one of the item A to a shopping cart and performing processing of adding two of the item B to the shopping cart. Then, the execution unit 14 executes processing of adding one item A and two items B to the shopping cart $B_K$ according to the processing determined by the determination unit 13 (see the shopping list $L_3$ in the shopping cart $B_K$).

Note that the processing executed in accordance with the direction of selection and the number of selections is not limited to the above-described examples, and any processing may be executed as long as they are different from each other in accordance with the direction of selection and the number of selections. For example, in the case where an object is an icon or the like that identifies data, a file or the like, the execution unit 14 may execute processing of ZIP compression of data or the like identified by the icon when the selected object is enclosed once in the first direction by the trajectory T of the position information, execute processing of encrypted ZIP compression of data or the like identified by the icon when it is enclosed twice in the first direction, execute processing of Lha low compression of data or the like identified by the icon when it is enclosed once in the second direction, and execute processing of Lha high compression of data or the like identified by the icon when it is enclosed twice in the second direction. Further, the execution unit 14 may execute processing of DES encryption of data or the like identified by the icon when the selected object is enclosed once in the first direction by the trajectory T of the position information, execute processing of AES encryption of data or the like identified by the icon when it is enclosed twice in the first direction, execute processing of DES decryption of data or the like identified by the icon when it is enclosed once in the second direction, and execute processing of AES decryption of data or the like identified by the icon when it is enclosed twice in the second direction.

Figure 10:
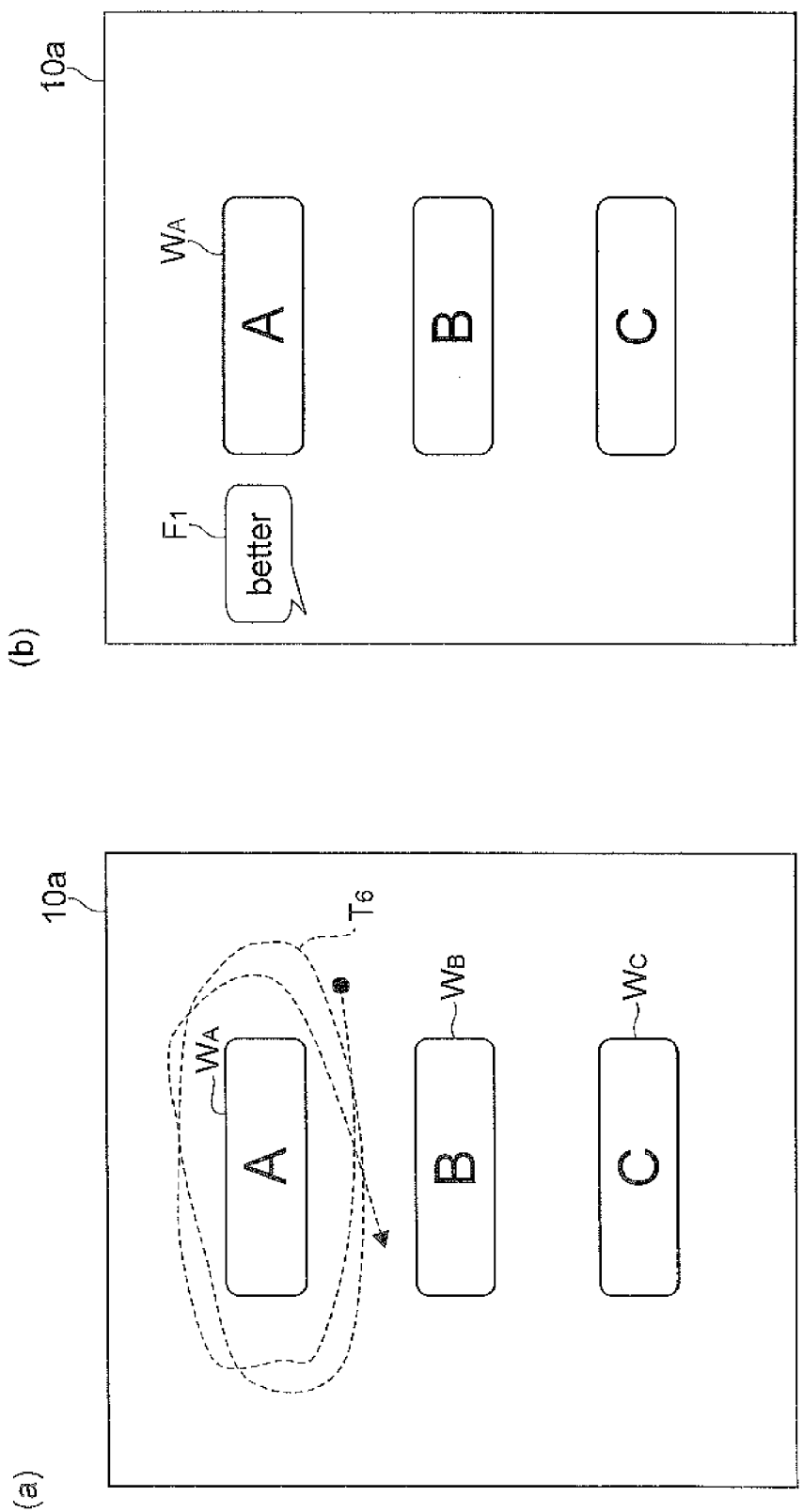
FIG. 10 is a diagram showing another embodiment where processing in accordance with the number of selections and the direction of selection of a selected object is executed.

Other embodiments where processing in accordance with the number of selections and the direction of selection of the selected object is executed are described hereinafter with reference to FIGS. 10 and 11. FIGS. 10 and 11 are diagrams showing examples of processing of evaluating an item on an item evaluation screen in the case where the data processing device 1 provides a site that evaluates items and the like, and icons W that identify items are displayed on the display area 10a.

Note that, in the examples shown in FIGS. 10 and 11, when the icon W is enclosed in the clockwise direction, processing of making an item represented by the icon W selected as an item to be evaluated is executed, and further processing of assigning weights in accordance with the number of times the icon W is enclosed as a parameter to the item is executed. The weights are represented in three levels: "good", "better" and "best" and associated as a flag F with the icon W on the display area 10a. On the other hand, when the icon W is enclosed in the counterclockwise direction, processing of lowering the weights set to an item represented by the icon or processing of excluding the item from an item to be evaluated to make it unselected is executed. The degree of lowering the weights is set in accordance with the number of selections.

In the example shown in FIG. 10(a), an image including icons $W_A$ to $W_C$ that represent items is displayed on the display area 10a of the touch panel 10, and the trajectory $T_6$ of the position information encloses the icon $W_A$ twice in the clockwise direction. In this case, the recognition unit 12 recognizes the icon $W_A$ as the selected object. Further, the recognition unit 12 recognizes the clockwise direction as the direction of selection and recognizes twice as the number of selections. Then, the determination unit 13 determines to perform processing of selecting the item A as an item to be evaluated and adding a flag $F_1$ "better" representing the second level of evaluation corresponding to the number of selections "twice" based on the direction of selection and the number of selections recognized by the recognition unit 12. Then, the execution unit 14 executes processing of adding the flag $F_1$ to the icon $W_A$ representing the item A in accordance with the processing determined by the determination unit 13 as shown in FIG. 10(b).

Note that, when an operation of enclosing an icon twice such as shown in FIG. 10(a) is performed, a flag in accordance with the number of times the icon is enclosed may be displayed each time the icon is enclosed. Specifically, at the point of time when the icon $W_A$ is enclosed once by the trajectory $T_6$ of the position information, the determination unit 13 determines to perform processing of adding the flag "good" representing the first level of evaluation, and the execution unit 14 executes processing of adding the flag to the icon $W_A$. Then, at the point of time when the icon $W_A$ is further enclosed once by the trajectory $T_6$ of the position information, the determination unit 13 determines to perform processing of adding the flag $F_1$ "better" representing the second level of evaluation, and the execution unit 14 executes processing of adding the flag to the icon $W_A$.

In the example shown in FIG. 11(a), in the state of the display screen shown in FIG. 10(b), the trajectory $T_7$ of the position information encloses the icon $W_B$ three times in the clockwise direction and continuously encloses the icon $W_A$ once in the counterclockwise direction. In this case, the determination unit 13 determines to perform processing of selecting the item B as an item to be evaluated and adding a flag $F_3$ representing the third level of evaluation corresponding to the number of selections "three times". Further, the determination unit 13 determines to perform processing of lowering the level of weights from the second level of weights having assigned to the item A by one level corresponding to the number of selections "once" and adding a flag $F_2$ representing the first level of evaluation. Then, the execution unit 14 executes processing of adding the flag $F_2$ to the icon $W_A$ representing the item A and adding the flag $F_3$ to the icon $W_B$ representing the item B in accordance with the processing determined by the determination unit 13 as shown in FIG. 11(b).

Figure 12:
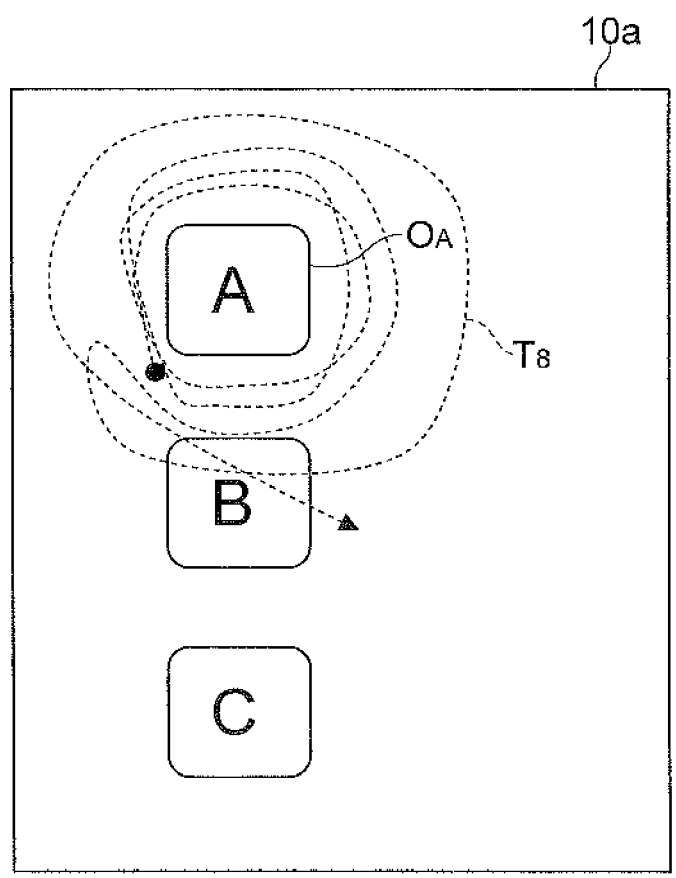
FIG. 12 is a diagram showing an example of recognition of the number of selections by a recognition unit.

Note that the recognition unit 12 can recognize the number of times obtained by subtracting, from the number of times the selected object is enclosed in one direction by the trajectory T of the position information, the number of times it is enclosed in the opposite direction to the one direction as the number of selections in one direction. Such recognition of the number of selections is described specifically with reference to FIG. 12. In the example shown in FIG. 12, the object $O_A$ is enclosed three times in the clockwise direction and then enclosed once in the counterclockwise direction by the trajectory $T_8$ of the position information. In this case, the recognition unit 12 recognizes twice, which is a result of subtracting one from three, as the number of selections in the clockwise direction. This allows easy adjustment of the number of selections for determining the processing to be performed on the selected object.

Figure 13:
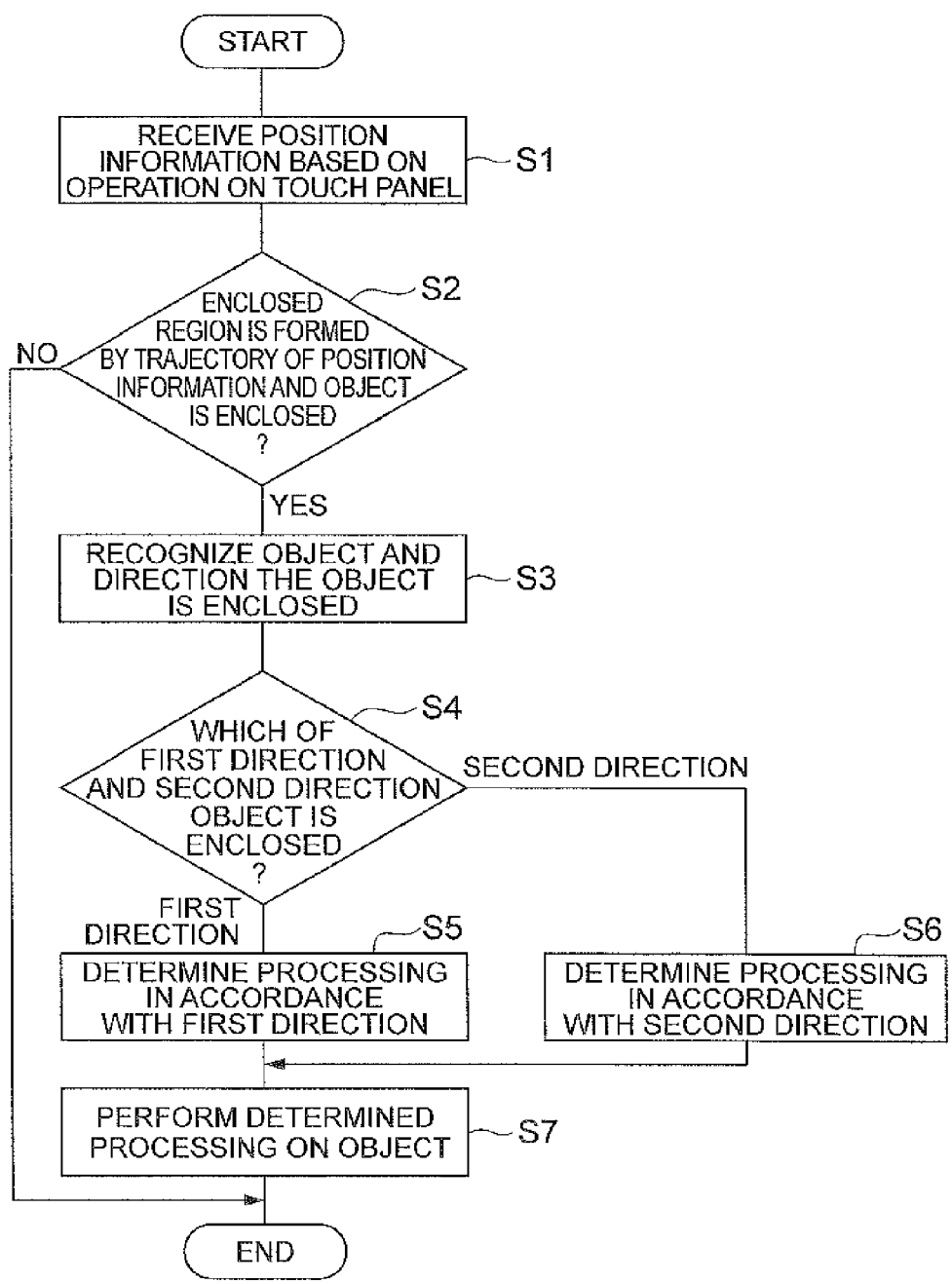
FIG. 13 is a flowchart showing a process in a data processing device.

The operation of the data processing device 1 according to this embodiment is described hereinafter with reference to FIG. 13. FIG. 2 is a flowchart showing a process of a data processing method performed in the data processing device 1.

First, the acquisition unit 11 acquires position information indicating the position of an instruction input received by the input unit 10b of the touch panel 10 (S1). The recognition unit 12 specifies an enclosed region on the basis of the trajectory of the position information received by the acquisition unit 11 based on the sequential instruction inputs through the input unit 10b and determines whether an object is enclosed by the enclosed region (S2). When it is determined that an object is enclosed by the enclosed region, the process proceeds to Step S3. On the other hand, when it is not determined that an object is enclosed by the enclosed region, the process ends.

In Step S3, the recognition unit 12 recognizes the object enclosed by the enclosed region and recognizes the direction in which the object is enclosed by the trajectory of the position information as the direction of selection (S3). The recognition unit 12 then determines which of the first direction and the second direction opposite to the first direction the direction of selection is (S4). When the direction of selection is the first direction, the process proceeds to Step S5. On the other hand, when the direction of selection is the second direction, the process proceeds to Step S6.

In Step S5, the determination unit 13 determines to perform processing in accordance with the first direction on the selected object (S5). On the other hand, in Step S6, the determination unit 13 determines to perform processing in accordance with the second direction on the selected object (S6). Then, in Step S7, the execution unit 14 executes the processing determined in Step S5 or S6 on the object (S7).

Figure 14:
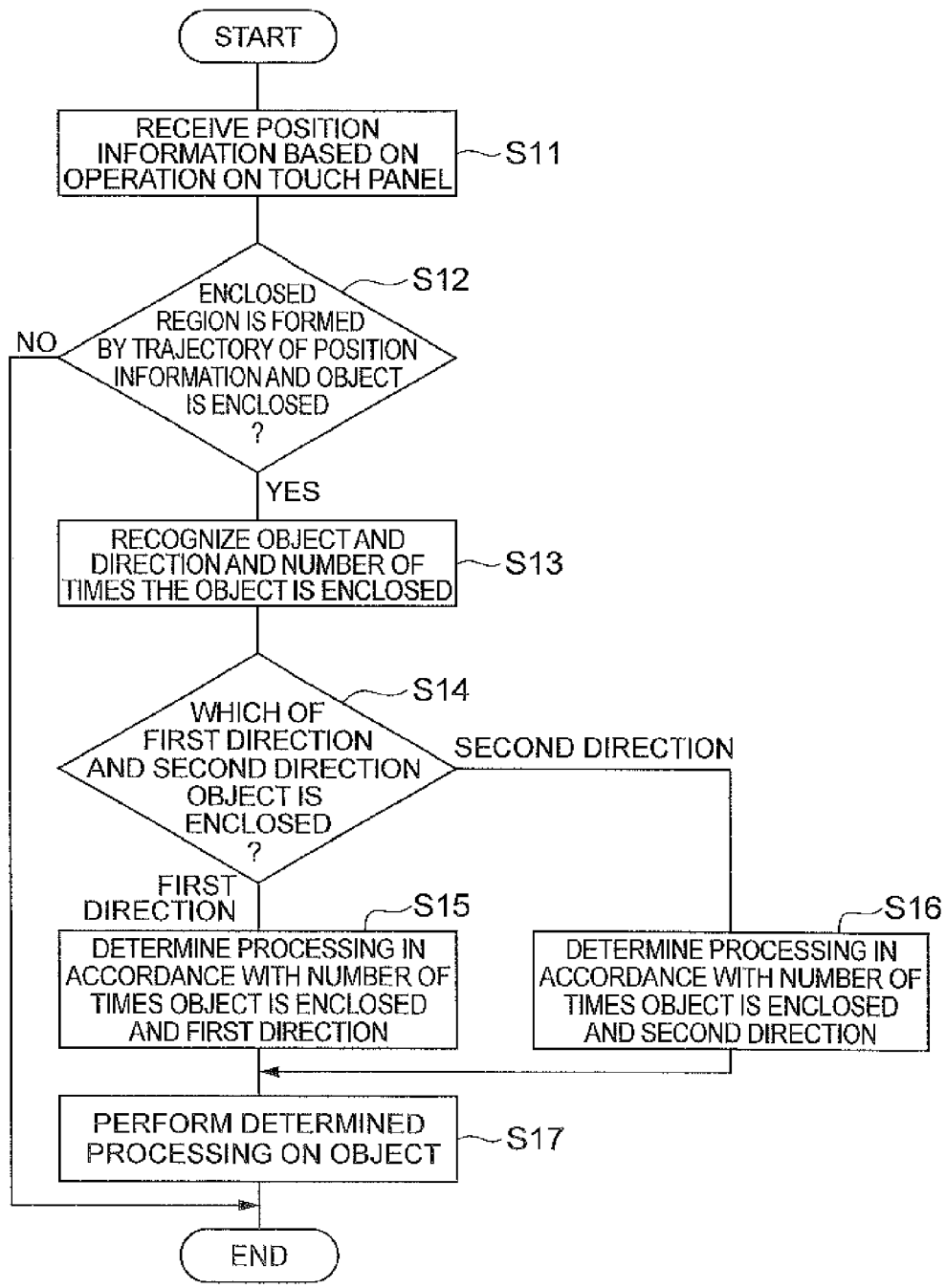
FIG. 14 is a flowchart showing a process in a data processing device.

Another example of the data processing method performed in the data processing device 1 is described hereinafter with reference to FIG. 14. The processing of Steps S11 to S12 is the same as the processing of Steps S1 to S2 in FIG. 13. In the following Step S13, the recognition unit 12 recognizes the object enclosed by the enclosed region and recognizes the direction and the number of times the object is enclosed by the trajectory of the position information as the direction of selection and the number of selections (S13).

Then, the recognition unit 12 determines which of the first direction and the second direction opposite to the first direction the direction of selection is (S14). When the direction of selection is the first direction, the process proceeds to Step S15. On the other hand, when the direction of selection is the second direction, the process proceeds to Step S16.

In Step S15, the determination unit 13 determines to perform processing in accordance with the number of selections, which is the number of times the object is enclosed by the trajectory of the position information, and the first direction on the selected object (S15). On the other hand, in Step S16, the determination unit 13 determines to perform processing in accordance with the number of selections and the second direction on the selected object (S16). Then, in Step S17, the execution unit 14 executes the processing determined in Step S15 or S16 on the object (S17).

Figure 15:
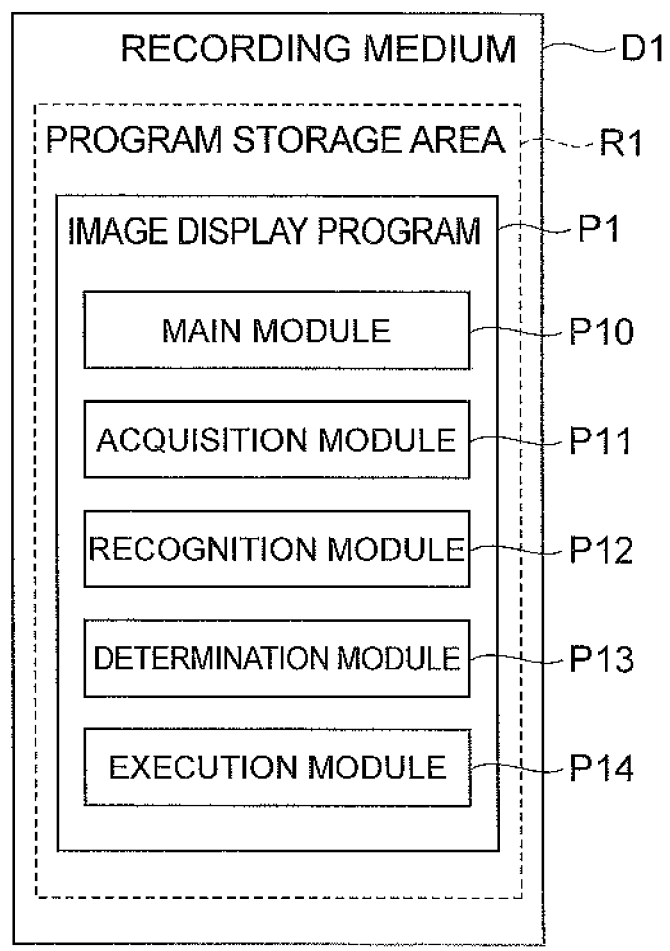
FIG. 15 is a diagram showing a configuration of a data processing program.

A data processing program that causes a computer to function as the data processing device 1 is described hereinafter with reference to FIG. 15. A data processing program P1 includes a main module P10, an acquisition module P11, a recognition control module P12, a determination module P13, and an execution module P14.

The main module P10 is a part that exercises control over the object processing. The functions implemented by executing the acquisition module P11, the recognition control module P12, the determination module P13 and the execution module P14 are equal to the functions of the acquisition unit 11, the recognition unit 12, the determination unit 13 and the execution unit 14 of the data processing device 1 shown in FIG. 1, respectively.

The data processing program P1 is provided through a storage medium such as CD-ROM or DVD-ROM or semiconductor memory, for example. Further, the data processing program P1 may be provided as a computer data signal superimposed onto a carrier wave over a communication network.

According to the data processing device 1, the data processing method and the data processing program P1 described above, when, upon sequential instruction inputs by a user, an operation of enclosing an object displayed on a display screen by the trajectory of position information indicated by the instruction inputs is performed, the object is recognized as the selected object and further the direction of selection in which the selected object is enclosed is recognized by the recognition unit 12. Then, processing determined by the determination unit 13 in accordance with the direction of selection is executed on the selected object, and therefore selection of processing desired by a user is made by simple instruction inputs such as selection of the direction of enclosing an object by the trajectory of position information, and the selected processing can be executed on the selected object.

Hereinbefore, the present invention has been described in detail with respect to the embodiment thereof. However, the present invention is not limited to the above-described embodiment. Various changes and modifications may be made therein without departing from the scope of the invention.

INDUSTRIAL APPLICABILITY

As described above, according to the embodiment, there is provided a data processing device that allows execution of processing desired by a user among candidates for processing with a simple instruction input.

REFERENCE SIGNS LIST

1 . . . data processing device, 10 . . . touch panel, 10a . . . display area, 10b . . . input unit, 11 . . . acquisition unit, 12 . . . recognition unit, 13 . . . determination unit, 14 . . . execution unit, D1 . . . storage medium, P1 . . . data processing program, P10 . . . main module, P11 . . . acquisition module, P12 . . . recognition module, P13 . . . determination module, P14 . . . execution module

The invention claimed is:

1. A data processing device including a display unit configured to display an image including an identification image identifying data to be processed in an image display area on a display screen and an input unit configured to receive an instruction input indicating a position on the display screen, comprising:

an acquisition unit configured to acquire position information indicating a position of an instruction input received by the input unit;

a recognition unit configured to specify an enclosed region in the image display area based on a trajectory indicated by a set of position information acquired by the acquisition unit according to sequential instruction inputs through the input unit, and when an identification image identifying data to be processed is included in the enclosed region, recognize the identification image as a selected identification image and recognize a direction the selected identification image is enclosed by the trajectory of the set of position information as a direction of selection;

a determination unit configured to determine processing to be executed on the data to be processed in accordance with the direction of selection recognized by the recognition unit; and an execution unit configured to execute the processing determined by the determination unit on the data to be processed, wherein the identification image is a representative image representing the data to be processed on the display and is different from the data to be processed itself, the recognition unit recognizes which of a first direction and a second direction opposite to the first direction the direction of selection is, the determination unit determines to execute first processing on the data to be processed when the selected identification image is enclosed in the first direction by the trajectory of the set of position information and execute second processing different from the first processing on the data to be processed when the selected identification image is enclosed in the second direction by the trajectory of the set of position information, the first processing is processing of changing the data to be processed from a first state to a second state, the second processing is processing of changing the data to be processed from the second state to the first state, and the display unit is further configured to display, on a part of the display screen, a result of the executed processing.

2. A data processing device including a display unit configured to display an image including an identification image identifying data to be processed in an image display area on a display screen and an input unit configured to receive an instruction input indicating a position on the display screen, comprising:

an acquisition unit configured to acquire position information indicating a position of an instruction input received by the input unit;

a recognition unit configured to specify an enclosed region in the image display area based on a trajectory indicated by a set of position information acquired by the acquisition unit according to sequential instruction inputs through the input unit, and when an identification image identifying data to be processed is included in the enclosed region, recognize the identification image as a selected identification image and recognize a direction the selected identification image is enclosed by the trajectory of the set of position information as a direction of selection;

a determination unit configured to determine processing to be executed on the data to be processed in accordance with the direction of selection recognized by the recognition unit; and an execution unit configured to execute the processing determined by the determination unit on the data to be processed, wherein the identification image is a representative image representing the data to be processed on the display and is different from the data to be processed itself, the recognition unit further recognizes a number of times the selected identification image is enclosed by the trajectory of the set of position information as a number of selections, the determination unit determines processing to be executed on the data to be processed in accordance with the direction of selection and the number of selections recognized by the recognition unit, the processing to be executed on the data to be processed is processing of changing the data to be processed from a first state to a second state, and the display unit is further configured to display, on a part of the display screen, a result of the executed processing.

3. The data processing device according to claim 2, wherein the recognition unit recognizes which of a first direction and a second direction opposite to the first direction the direction of selection is, the first processing is processing of changing the data to be processed from an unselected state to a selected state in a quantity corresponding to the number of selections in the first direction, and the second processing is processing of changing the data to be processed from a selected state to an unselected state in a quantity corresponding to the number of selections in the second direction.

4. The data processing device according to claim 2, wherein the recognition unit recognizes which of a first direction and a second direction opposite to the first direction the direction of selection is, the first processing is processing of increasing a level of weights on the data to be processed by a level corresponding to the number of selections in the first direction, and the second processing is processing of decreasing a level of weights on the data to be processed by a level corresponding to the number of selections in the second direction.

5. The data processing device according to claim 2, wherein the recognition unit recognizes a number of times obtained by subtracting, from the number of times the selected identification image is enclosed in one direction by the trajectory of the set of position information, the number of times the selected object is enclosed in an opposite direction to the one direction as the number of selections in the one direction.

6. The data processing device according to claim 1, wherein the first processing is processing of encrypting the data to be processed, and the second processing is processing of decrypting the data to be processed.

7. The data processing device according to claim 1, wherein the first processing is processing of compressing the data to be processed, and the second processing is processing of decompressing the data to be processed.

8. A data processing method in a data processing device, including at least one processor, a display unit configured to display an image including an identification image identifying data to be processed in an image display area on a display screen and an input unit configured to receive an instruction input indicating a position on the display screen, the method comprising:

acquiring, using said at least one processor, position information indicating a position of an instruction input received by the input unit;

specifying, using said at least one processor, an enclosed region in the image display area based on a trajectory indicated by a set of acquired position information according to sequential instruction inputs through the input unit, and when an identification image identifying data to be processed is included in the enclosed region, recognizing, using said at least one processor, the identification image as a selected identification image and recognizing a direction in which the selected identification image is enclosed by the trajectory of the set of position information as a direction of selection;

determining, using said at least one processor, processing to be executed on the data to be processed in accordance with the recognized direction of selection; and executing, using said at least one processor, the determined processing on the data to be processed, wherein the identification image is a representative image representing the data to be processed on the display and is different from the data to be processed itself, the recognizing recognizes which of a first direction and a second direction opposite to the first direction the direction of selection is, the determining determines to execute first processing on the data to be processed when the selected identification image is enclosed in the first direction by the trajectory of the set of position information and execute second processing different from the first processing on the data to be processed when the selected identification image is enclosed in the second direction by the trajectory of the set of position information, the first processing is processing of changing the data to be processed from a first state to a second state, the second processing is processing of changing the data to be processed from the second state to the first state, and the display unit is further configured to display, on a part of the display screen, a result of the executed processing.

9. A data processing method in a data processing device, including at least one processor, a display unit configured to display an image including an identification image identifying data to be processed in an image display area on a display screen and an input unit configured to receive an instruction input indicating a position on the display screen, the method comprising:

acquiring, using said at least one processor, position information indicating a position of an instruction input received by the input unit;

specifying, using said at least one processor, an enclosed region in the image display area based on a trajectory indicated by a set of acquired position information according to sequential instruction inputs through the input unit, and when an identification image identifying data to be processed is included in the enclosed region, recognizing, using said at least one processor, the identification image as a selected identification image and recognizing a direction in which the selected identification image is enclosed by the trajectory of the set of position information as a direction of selection;

determining, using said at least one processor, processing to be executed on the data to be processed in accordance with the recognized direction of selection; and executing, using said at least one processor, the determined processing on the data to be processed, wherein the identification image is a representative image representing the data to be processed on the display and is different from the data to be processed itself, the recognizing further recognizes a number of times the selected identification image is enclosed by the trajectory of the set of position information as a number of selections, the determining determines processing to be executed on the data to be processed in accordance with the direction of selection and the recognized number of selections, the processing to be executed on the data to be processed is processing of changing the data to be processed from a first state to a second state, and the display unit is further configured to display, on a part of the display screen, a result of the executed processing.

* * * * *